United States Patent [19]
Chang et al.

[11] Patent Number: 5,828,809
[45] Date of Patent: Oct. 27, 1998

[54] METHOD AND APPARATUS FOR EXTRACTING INDEXING INFORMATION FROM DIGITAL VIDEO DATA

[75] Inventors: Yuh-Lin Chang, Monmouth Junction; Wenjun Zeng, Princeton, both of N.J.

[73] Assignee: Matsushita Electric Industrial Co., Ltd., Osaka, Japan

[21] Appl. No.: 723,594

[22] Filed: Oct. 1, 1996

[51] Int. Cl.[6] .................................................. H04N 5/91
[52] U.S. Cl. ................................................. 386/69; 386/68
[58] Field of Search .................................. 386/69, 96, 95, 386/104, 52, 46, 39, 68; 704/270, 231, 235; H04N 5/91

[56] References Cited

U.S. PATENT DOCUMENTS

| | | | |
|---|---|---|---|
| 5,199,077 | 3/1993 | Wilcox et al. | 381/43 |
| 5,561,796 | 10/1996 | Sakamoto et al. | 386/96 |
| 5,627,656 | 5/1997 | Sonohara et al. | 386/96 |
| 5,649,060 | 7/1997 | Ellozy et al. | 395/2.87 |

*Primary Examiner*—Robert Chevalier
*Attorney, Agent, or Firm*—Harness, Dickey & Pierce, P.L.C.

[57] ABSTRACT

A method and apparatus to automatically index the locations of specified events on a video tape. The events, for example, include touchdowns, fumbles and other football-related events. An index to the locations where these events occur are created by using both speech detection and video analysis algorithms. A speech detection algorithm locates specific words in the audio portion data of the video tape. Locations where the specific words are found are passed to the video analysis algorithm. A range around each of the locations is established. Each range is segmented into shots using a histogram technique. The video analysis algorithm analyzes each segmented range for certain video features using line extraction techniques to identify the event. The final product of the video analysis is a set of pointers (or indexes) to the locations of the events in the video tape.

50 Claims, 10 Drawing Sheets

METHOD AND APPARATUS FOR EXTRACTING INDEXING INFORMATION FROM DIGITAL VIDEO DATA

BACKGROUND OF THE INVENTION

The present invention relates generally to context-based video indexing and video information extraction systems. More particularly, the invention relates to an information extraction system that combines and integrates both speech understanding and image analysis.

Indexing techniques make electronically stored information easier to locate. For example, a textual information database may be indexed by key words, allowing instances of those key words to be directly located, without requiring a start-to-finish sequential search of the entire database. By providing indexes or pointers in advance to predefined key words, the information retrieval system can later locate instances of those key words much quicker and more efficiently than the brute force technique of searching the entire database, one element at a time.

Desirably, image-based information systems might also be indexed, to allow certain key images to be quickly and efficiently accessed. Similarly, audio-video information (e.g. video tapes, multi-media, video-on-demand services, digital libraries and media resources for video editing systems) could also benefit from an indexing system.

Although the benefits of indexing may be readily appreciated, the manner of constructing the indexing system is a complex problem, particularly when audio-video information is involved. Indeed, the problem is far more complex than constructing an index for a textual information system. This is because whereas the textual information system may be readily parsed into discrete words, that can each be compared with predefined key words on a character-by-character basis; audio-video information is far too rich and complex to be similarly parsed. To appreciate the complexity of the problem, and also to provide a useful example in demonstrating the invention, consider the problem of locating the precise audio-video moments at which all touchdowns occurred in last year's superbowl. The object is to locate these events by extracting information from the audio-video data screen so that indexes can be created to record the location of those events for future reference.

The implications of extracting this data from an audio-video data source are far reaching, as audio-video data would then be susceptible to all manner of trends analysis. A football coach, for example, could use the indexed database of audio-video information to analyze all occurrences in which a competitor was within a certain distance from the goal line. Thereupon, the coach could examine those occurrences to determine trends in the competitor's behavior when the competitor is close to the goal line. In this regard, the indexing system would not be limited to simply to goal line proximity or touchdowns. Rather, the indexing system could index the entire game according to predetermined key events or other audio-video indicia, allowing the user to submit reasonably complex queries to the information system.

Past approaches to indexing video-based information included tagging video with descriptive textual messages. A video is then searched by providing keywords to search for the descriptive textual messages accompanying the video. However, the disadvantage remains that not only does the text entries have to be created for a number of images (a very labor-intensive proposition), but also the text may not adequately describe the entire associated video.

Indexing video-based information presents unique problems due the inherent difference between a visual format and a textual format. Accordingly, conventional textual indexing methods largely cannot be used to provide efficient indexes to video-based information.

Past approaches which use video analysis algorithms include work performed by Gong et al. (Y. Gong et al. *Automatic Parsing of TV Soccer Programs,* The 2nd ACM International Conference on Multimedia Computing, pp. 167–174, May 1995). Their approach determines the video content based on predefined key features of the image and a comparison of them to an a priori model. The approach only analyzes video data and does not include analyzing the auditory data which I believe to be highly indicative of the content of the accompanying video.

SUMMARY OF THE INVENTION

The present invention automatically extracts indexing information from a video tape data based on its audio and video contents.

A two step process is employed. Audio processing modules are first applied to locate candidates in the whole data. This information is passed to the video processing modules which further analyze the video. The final products of video analysis are in the form of pointers (or indexes) to the locations of interesting events in a video.

The present invention is a computer-implemented speech and video analysis system for creating an index to indicate locations of a first event occurring within audio-video data. The audio-video data contains audio data synchronized with video data to represent a plurality of events. The first event has at least one audio-feature and at least one video-feature indicative of the first event. The present invention uses a model speech database for storing speech models representative of the audio-feature and a model video database for storing video models representative of the video-feature. Wordspotting is performed to determine candidates by comparing the audio data with the stored speech models. The candidates indicate positions of the audio-feature within the audio data. Predetermined ranges are established around each of the candidates. Portions of the video data which are located within the ranges are segmented into shots. The segmented video data is analyzed to determine video-locations based on a comparison between the segmented video data and the stored video locations. The video-locations indicate positions of the video-feature within the video data. An index is generated to indicate locations of the first event based on the video-locations.

BRIEF DESCRIPTION OF THE DRAWINGS

Additional advantages and features of the present invention will become apparent from the subsequent description and the appended claims, taken in conjunction with the accompanying drawings, in which:

FIG. 8b is a line segmentation graphic representation of the graphic frame's contents of FIG. 8a;

FIG. 9b is a line segmentation graphic representation of the graphic frame's contents of FIG. 9a.

DETAILED DESCRIPTION OF THE PREFERRED EMBODIMENTS

Figure 1:
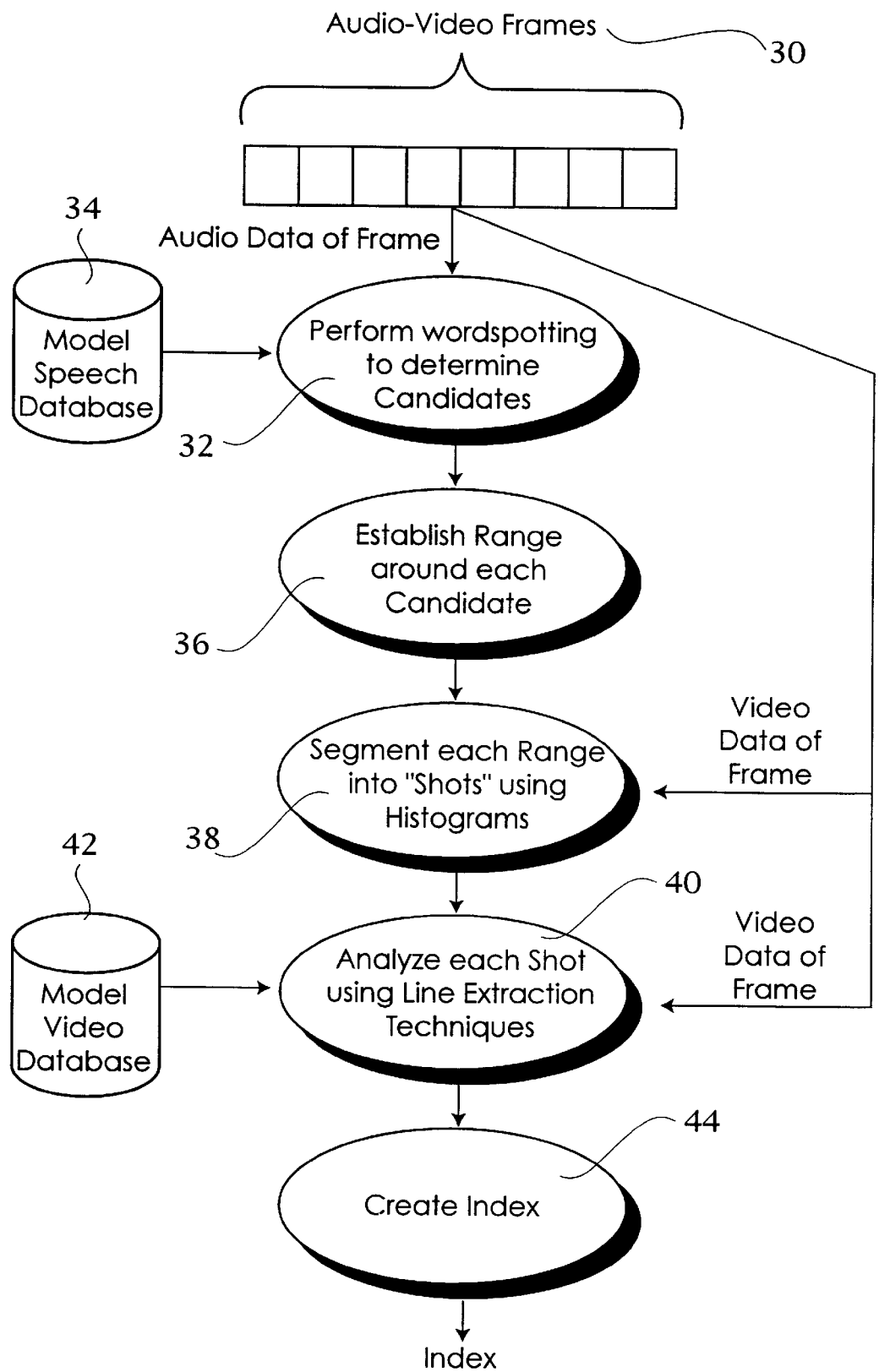
FIG. 1 is functional flow diagram depicting top-level functions and data inputs and outputs of the present invention.

FIG. 1 provides a functional overview of the present invention. The audiovideo frames 30 of a video tape contain both audio data and also video data. The audio data portion contains data representing the sounds, such as spoken words, on the video tape. The video data portion contains data representing the visual aspects of the scenes on the video tape. If the audio and video data are not already in digital format, then they are converted into digital format before being processed by the present invention.

A wordspotter process 32 analyzes the audio data portion of the audiovideo frames 30 by performing wordspotting to determine candidates. The wordspotter process 32 uses a model speech database 34 to locate features within the audio data. For example, if a user is searching for touchdowns on the video tape, then the wordspotter process 32 searches for such specific features as the spoken word "touchdown". When the wordspotter process 32 determines that this audio feature as modeled in the model speech database 34 has been found, then the frame number in which the specific feature occurred is stored as a candidate.

The range process 36 establishes a predefined range about each of the candidates. The segmentation process 38 segments each of the ranges into "shots" based upon a histogram technique which bases segmentation upon the degree of difference between two adjacent frames. The shot analysis process 40 uses a model video database 42 to search for certain video features within the ranges established by the range process 36. The shot analysis process 40 uses line extraction techniques to compare the video data from the frames to the data in the model video database 42. For the touchdown example, a certain video feature for which the shot analysis process 40 would search would be football teams lining up opposed to one another. The model video database 42 would contain models of what the lineup should resemble. When the shot analysis process 40 has finished locating all of the video features within a video tape, an index creation process 44 creates an index of these frame locations.

Figure 2:
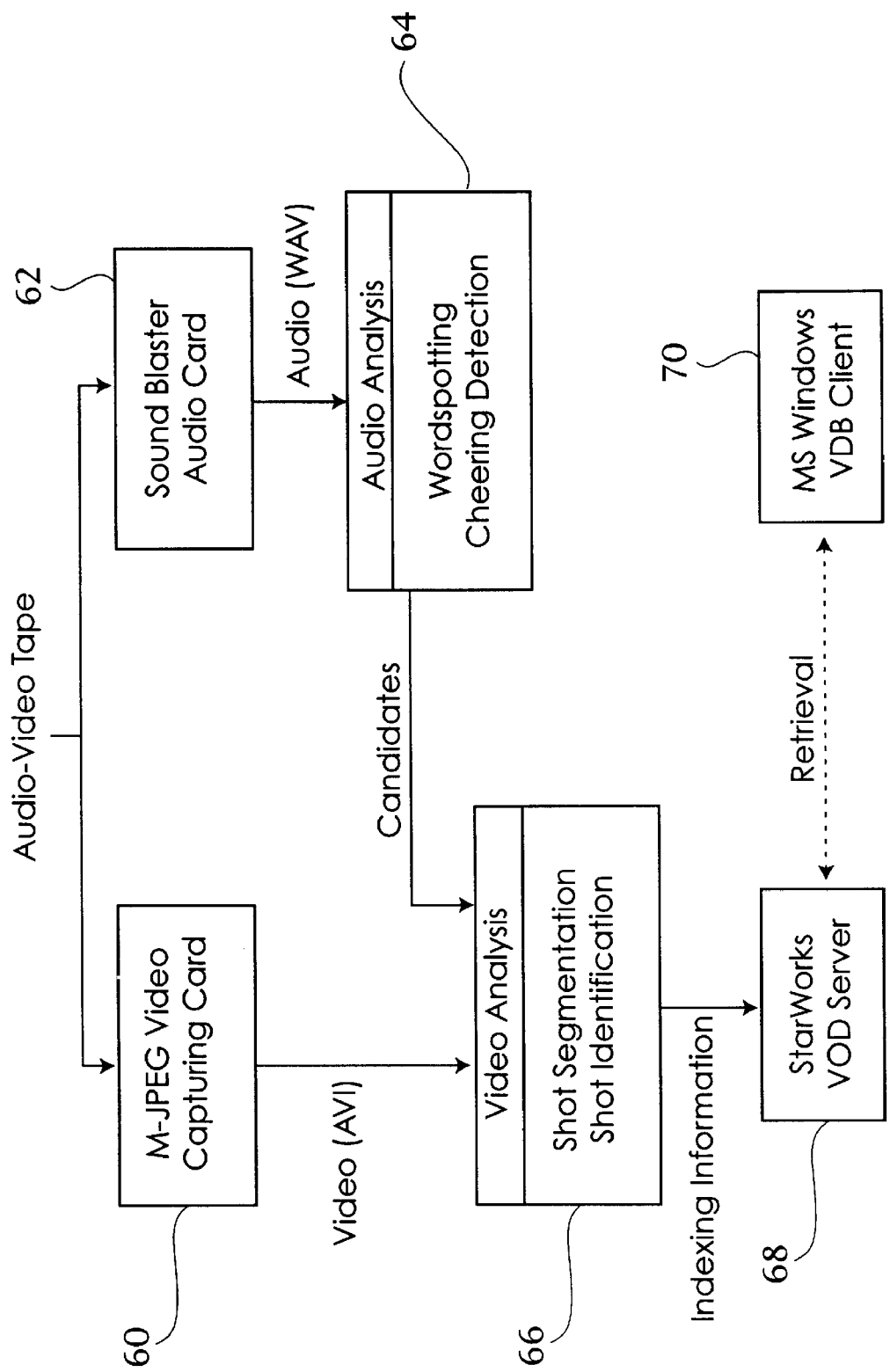
FIG. 2 is a block flow diagram showing an overview of the video and audio processing modules.

FIG. 2 shows the hardware modules and their flow of operation as used in the preferred embodiment. There are three major hardware components in the preferred embodiment: audio processing components, video processing components, and the demo video database.

The analog video data and analog audio data from a video tape are first digitized. The M-JPEG video capturing card 60 digitizes the video data into a digital AVI format. The Sound Blaster audio card 62 digitizes the audio data into a WAV format. The audio analysis module 64 locates candidates in the digitized audio data by performing wordspotting and if necessary by detecting the sound of cheering.

This information is passed to the video analysis module 66, which analyzes the video data by segmenting and identifying the shots. The indexing information from the video analysis module 66 is in the form of pointers to the locations of interesting events. The Khoros system was used in the preferred embodiment to implement the audio and video analysis algorithms.

The indexed video is placed on a LAN-based video-on-demand (VOD) server which for the preferred embodiment is the StarWorks VOD server 68. Also, a demo video database (VDB) client is used to retrieve the indexed video from a PC running Microsoft-Windows. The preferred embodiment uses a Microsoft Windows VDB client for this operation 70.

Audio Signal Analysis

One important observation concerning IV sports programs is that in such programs, the information content in audio is highly correlated with the information content in video. The high correlation results from the fact that a sports reporters job is to inform viewers with what is happening on the field. Therefore, if important keywords such as "touchdown" or "fumble" can be detected in the audio stream, then this audio data can be used as a coarse filter to locate candidates for important events.

According to the preferred embodiment, information is first extracted from the data using audio processing, since its computation is less expensive than video processing. The present invention uses a template-matching based approach to spotting keywords. However, it should be understood that the present invention is not limited to this approach since many other speech recognition algorithms exist—for example, other embodiments of the present invention entail using the speech recognition algorithms of Hidden Markov Models and Dynamic Time Warping.

The template-matching based approach provides reliable candidates for the present invention for the following reasons. Audio processing is used as a "preprocessing" for video analysis and, consequently, false alarms are not a major concern. Speaker independence is also not a major concern, since the sports reporters are usually known beforehand.

Figure 3:
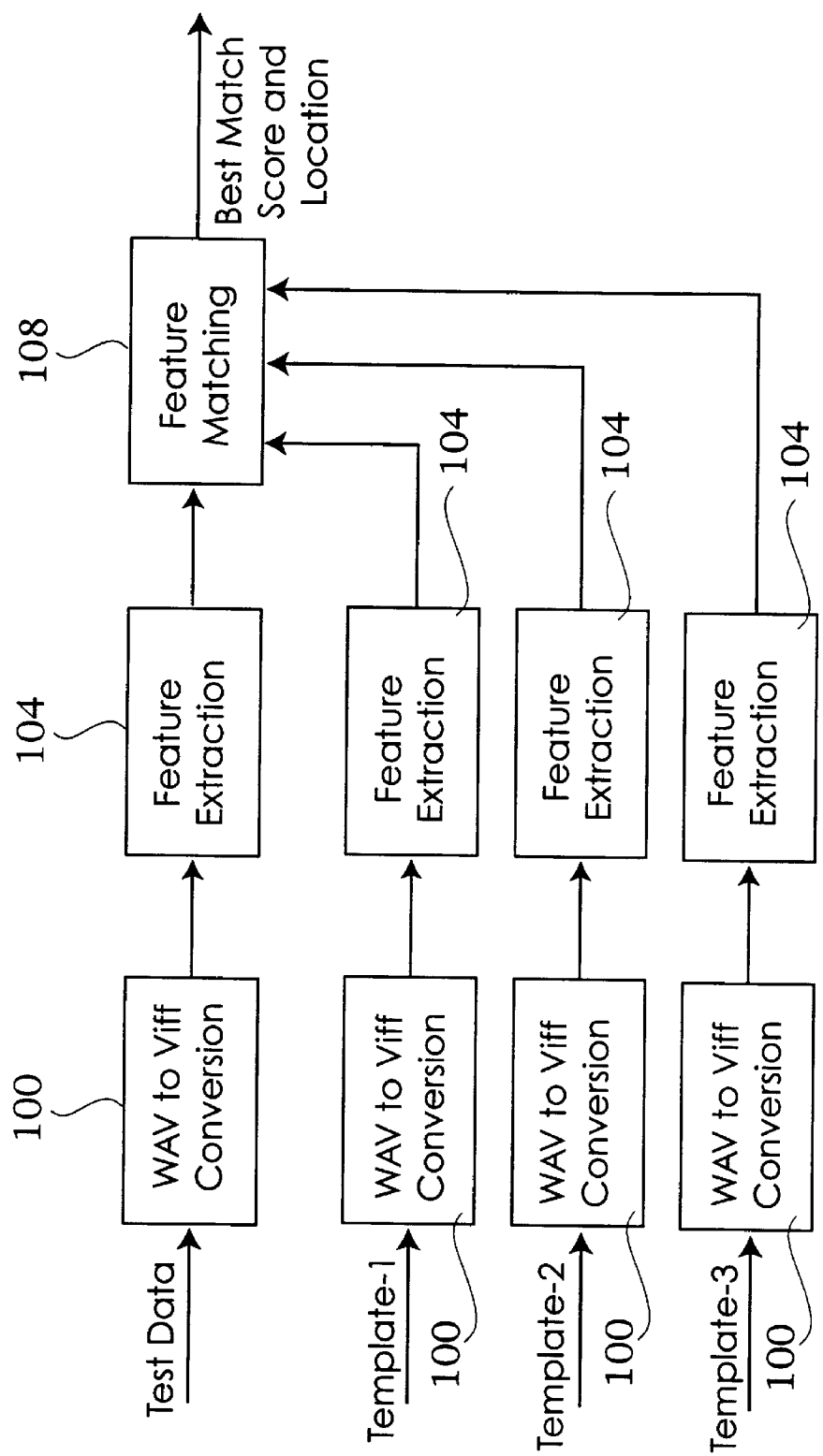
FIG. 3 is a block diagram depicting the wordspotting algorithm.

FIG. 3 shows the wordspotting algorithm for feature matching between templates and test data. First the audio VIFF data conversion module 100 converts the test audio data and the template audio data from the WAV format to the VIFF format. The VIFF format is the data format for the public domain package Lotec. Lotec is the preferred embodiment for the speech detection algorithm.

Feature extraction modules 104 extract features from the test audio data and the template audio data. Within the feature extraction modules 100, noise statistics are first collected from the template audio data to reduce the effect of background noise contained in the test audio data. The statistical information is used in filtering out the noise in the test data. Then the audio stream is split into segments of a fixed size of 10 ms each. Lastly, the test audio data and the template audio data are transformed into the frequency domain by fast Fourier transforms (FFT). A set of eight overlapping filters are applied to the Fourier magnitude, and the logarithm of the total energy in each bank is computed and used as "features" to represent the audio data. The filters covered frequencies from 150 to 4000 Hz.

A feature matching module 108 matches feature vectors derived from the test audio data against the features derived from the template audio data. The normalized distance between the test audio data and the template audio data was used to measure similarity. The distance between a template and the test data was defined as the Euclidean distance between the two 8-dimensional feature vectors. The distance was then normalized by the sum of energy in each template.

After the feature matching process, the best matches from all templates are sorted according to the distance. The inverse of distance is used to represent confidence of a match. If the confidence is greater than a preset threshold, a candidate is declared.

Video Information Analysis

The candidates detected by the audio analysis modules are further examined by the video analysis modules. Assuming that a touchdown candidate is located at time t, video analysis is applied to the region [t−1 minutes, t+2 minutes]. The assumption is that a touchdown event should begin and end within that time range. In video processing, the original video sequence is broken down into discrete shots. Key frames from each shot are extracted and shot identification is then applied on them to verify the existence of a touchdown.

More specifically within the video analysis modules, a video shot segmentation algorithm based on histogram difference is used. A segment is detected if a frame's histogram is considered "substantially different" from that of its previous frame, based on the $X^2$ comparison:

$$\sum_{i=1}^{G} \frac{(H_t(i) - H_{t-1}(i))^2}{H_t(i)}$$

where: $H_t$ is the histogram for time t, and
G is the total number of colors in an image.

Figure 4:
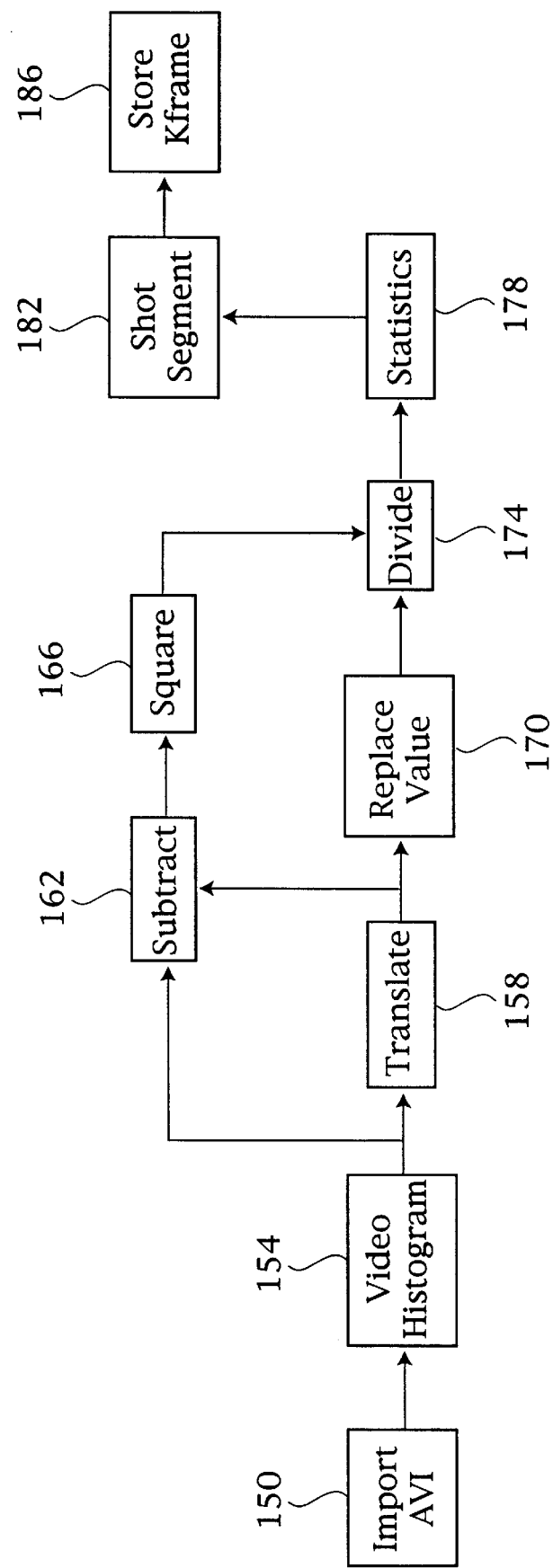
FIG. 4 is a functional flow block diagram showing the functional processing for the video shot segmentation algorithm.

FIG. 4 provides a flowchart of the shot segmentation operations which implement the $X^2$ comparison equation within the Khoros environment. The Import AVI operation 150 converts an AVI encoded data stream into VIFF. The Video Histogram operation 154 computes the histogram of a VIFF video. The Translate operation 158 is a Khoros function for shifting a VIFF object in time. The Subtract operation 162 is a Khoros function for subtracting two VIFF objects. The Square operation 166 is a Khoros function for applying the squaring operation on a VIFF object. The Replace Value operation 170 is a Khoros function for replacing the values of a VIFF object. It is employed to avoid division by zero. The Divide operation 174 is a Khoros function for dividing two VIFF objects. The Statistics operation 178 is a Khoros function for computing the statistics of a VIFF object. The Shot Segment operation 182 detects the shot transition boundary by locating the peaks in the histogram difference sequence. The Store Kframe operation 186 extracts the representative frames from each shot and stores them as a new VIFF video.

After the shot segmentation process has completed, the present invention uses a model-based approach to identify the contents of key frames. Starting with the candidate locations supplied by audio analysis, the present invention looks backward and forward a few shots to fit the model with the video data. If there is a high confidence in the matching, then a touchdown event is declared detected.

To identify shots as corresponding to the data in the model, some features of interests and their sequence of occurrences are extracted. In football videos, possible features of interests are line markers, players numbers, end zone, goal posts, and other football-related features.

Figure 5:
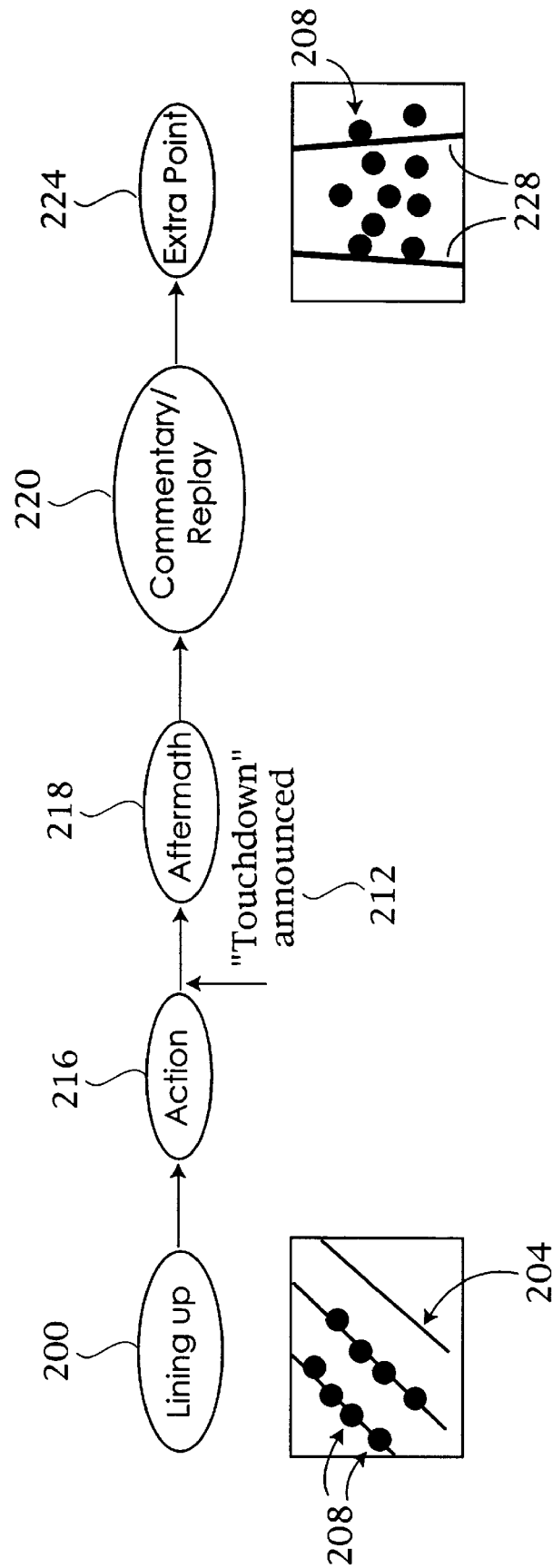
FIG. 5 is an event flow diagram showing the ideal shot or event transition model for a touchdown sequence.
Figure 6A:
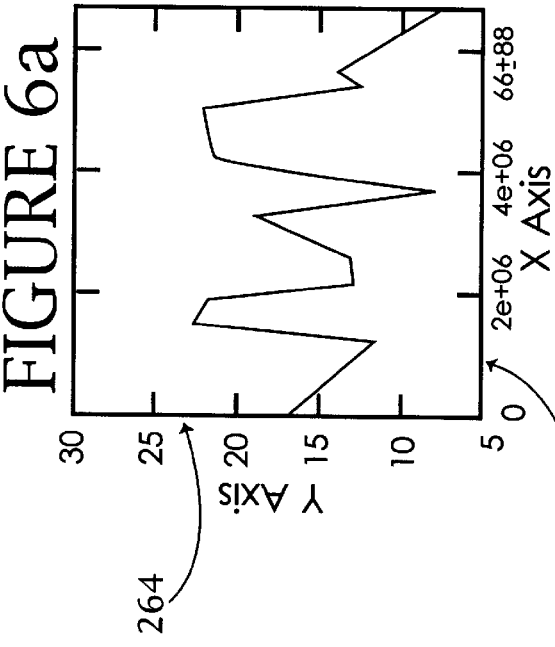
FIGS. 6a–6h are x-y graphs showing the wordspotting results for the eight wordspotting tests, where the x-axis represents time and the y-axis represents degree of confidence.
Figure 6B:
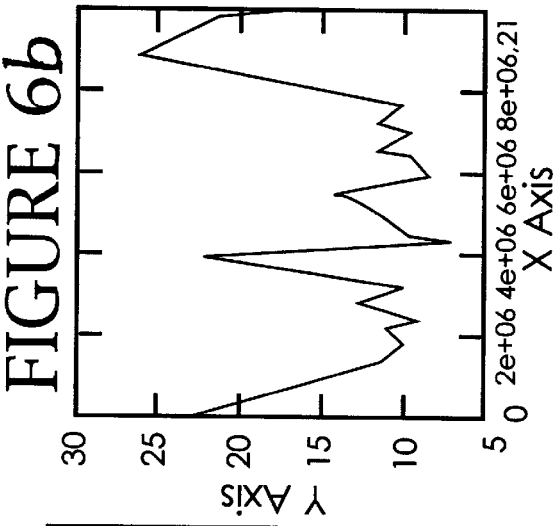
Figure 6C:
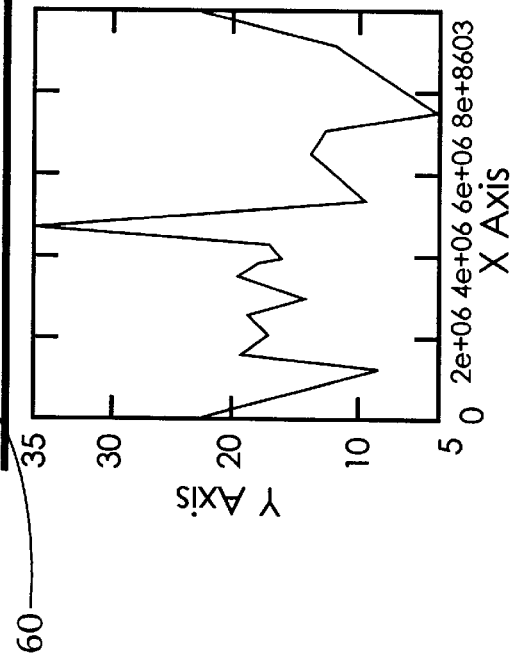
Figure 6D:
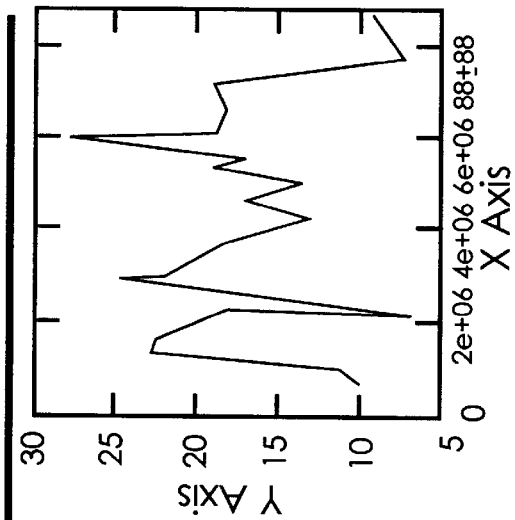
Figure 6E:
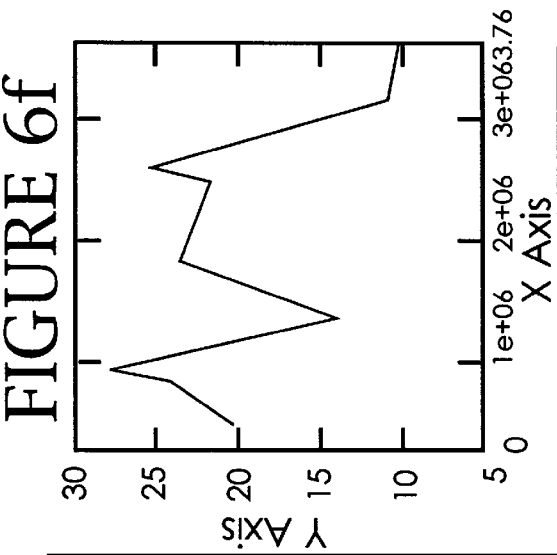
Figure 6F:
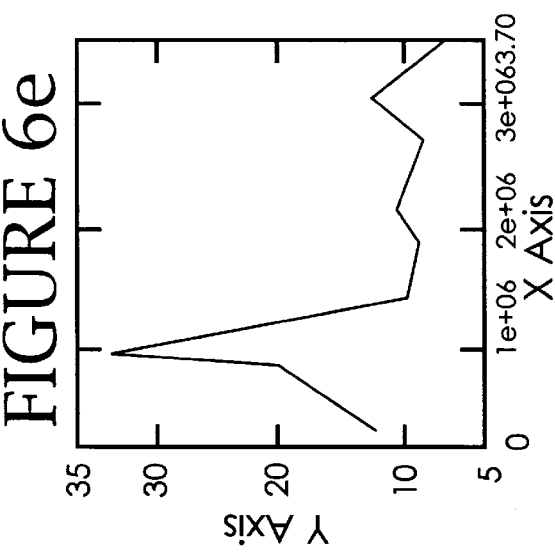
Figure 6G:
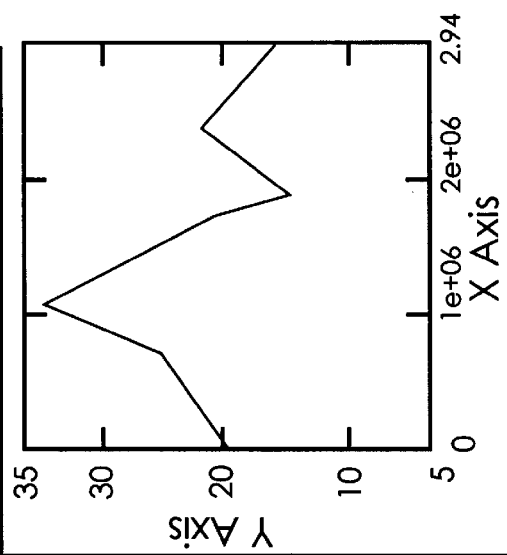
Figure 6H:
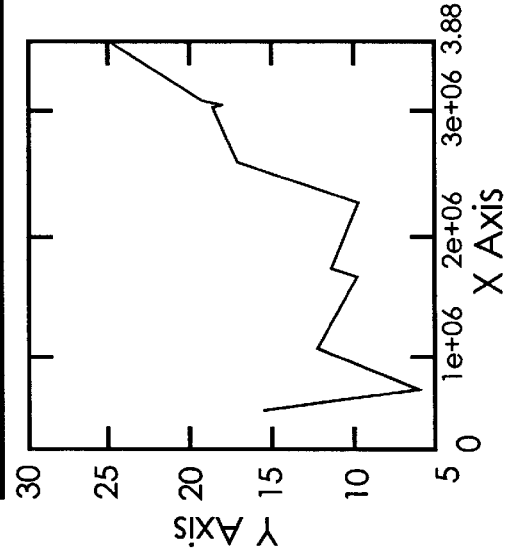

For example in a touchdown sequence, FIG. 5 shows what an ideal model considers the features of interest and the sequence of shots which would constitute a touchdown event. Ideally, a touchdown sequence should start with two teams lining up on the field (that is, the lining up shot 200). The lining up shot 200 typically shows slanted line markers 204 and players 208. The word touchdown 212 is usually announced in the middle or at the end of the action shot 216, which is followed by some kind of aftermath shot 218 and then some kind of commentary and replay shot 220. An extra point shot 224 usually concludes a touchdown sequence. The extra point shot typically shows the goalposts 228 as somewhat parallel lines with the players 208 mainly in between the goalposts 228. If the video data contains these features and in that relative sequence, then a touchdown event is declared.

This ideal touchdown video model covers most but not all the possible touchdown sequences. However, this embodiment still provides satisfactory results. The preferred embodiment of the present invention includes covering all possible touchdown sequences by constructing models of those sequences. For example, the preferred embodiment includes modeling a team attempting a two-point conversion subsequent to a touchdown.

The line extraction work used in the preferred embodiment for video recognition is based on the Object Recognition Toolkit. The Khoros system was modified to incorporate this Toolkit. For each shot, there are one or two representative frames. The gradient operation is first applied to these representative frames to detect edges. The edge pixels are then converted into lists of connected pixels by Pixel Chaining. The chain lists are segmented into straight-line segments which are further grouped into parallel lines. The parallel line pairs are then filtered by length and orientation.

For example, the detected parallel lines should be long and vertically oriented for goal posts. Similarly, the detected parallel lines should be long and diagonally oriented in order to become potential line markers.

The intensity values of an image have been used for line extraction in one embodiment of the present invention. However, other embodiments of the present invention utilize other information such as color and texture to improve performance.

Demo Video Database

A demo video database system running under the MSNFW (Microsoft Video for Windows) was used to demonstrate the present invention. The demo video database system has two parts: the server and the client.

The present invention used the StarWorks VOD system (from Starlight Networks Inc.) as the server. The server was running on an EISA-bus PC-486/66 with Lynx real-time operating system and 4 GB (gigabyte) storage space. A PC/Windows client can connect to the server through a regular 10-BaseT Ethernet. The server guarantees the real-time delivery of data (video and audio) streams of up to 12 Mbps (megabits per second) via two Ethernet segments.

For the client, a video player was developed for MS/VFW which can access the AVI video data together with the indexing information. Using this video player, a user can move directly to the next or previous shot, play, or event. Such search capabilities can be complementary to the traditional linear fast-forward/backward movements.

Example of the Present Invention

The algorithms of the present invention were tested with real TV programs. Table 1 below summarizes the data used in the experiments.

| Group | Name | # of frames | Time | Game | Touchdown |
|---|---|---|---|---|---|
| Training | td1 | 1,297 | 1:27 | Game 1, 1st Half | Yes |
| | td2 | 2,262 | 2:31 | Game 1, 1st Half | Yes |
| | td3 | 1,694 | 1:53 | Game 1, 1st Half | Yes |
| Test | 2ndHalf1 | 7,307 | 8:07 | Game 1, 2nd Half | No |
| | 2ndHalf2 | 6,919 | 7:41 | Game 1, 2nd Half | No |
| | 2ndHalf3 | 6,800 | 7:33 | Game 1, 2nd Half | Yes |
| | 2ndHalf4 | 5,592 | 6:37 | Game 1, 2nd Half | No |
| | 2ndHalf5 | 2,661 | 2:58 | Game 1, 2nd Half | Yes |
| | 2ndHalf6 | 2,774 | 3:05 | Game 1, 2nd Half | Yes |
| | 2ndHalf7 | 2,984 | 3:19 | Game 1, 2nd Half | Yes |
| | newgame 1 | 2,396 | 2:40 | Game 2 | Yes |

A total of 45 minutes of video and audio data from two football games were used for the test. The data was separated into two groups, the training and the test groups. Only data from the training group was used to train and to adjust system parameters. The resolution for video was 256 by 192 at 15 frames per second. The data rate for audio is 22 KHz with 8 bits per sample.

Audio Processing Results

FIGS. 6a through 6h show the results of audio processing on the eight test sets using Euclidean distances between the test sets and the template audio data. In each graph, the X-axis 260 represents time, and the Y-axis 264 indicates confidence. The higher the confidence, the more likely the existence of a touchdown. From the training data, the wordspotting threshold was set to a value of 25. Table 2 summarizes the audio processing results:

| Algorithm | Correct Detection | Miss Detection | False Alarms |
|---|---|---|---|
| Wordspotting | 4 (out of 5) | 1 (out of 5) | 0 |

In general, the wordspotting algorithm provided reliable results. Of the five touchdowns existing in the test data, only the one in 2ndhalf7 was not detected. The miss-detection was mainly due to the fact that in 2ndhalf7, the touchdown was announced in a way different from the three templates used. One embodiment entails reducing the threshold to 10, but the disadvantage is that this will generate a lot of false alarms (45 to be exact). Another embodiment collects more samples for templates to increase the accuracy. However, the first preferred embodiment uses a more robust matching algorithms, such as dynamic time warping. Another preferred embodiment uses an HMM (hidden Markov model) method.

Video Processing Results

Figure 7:
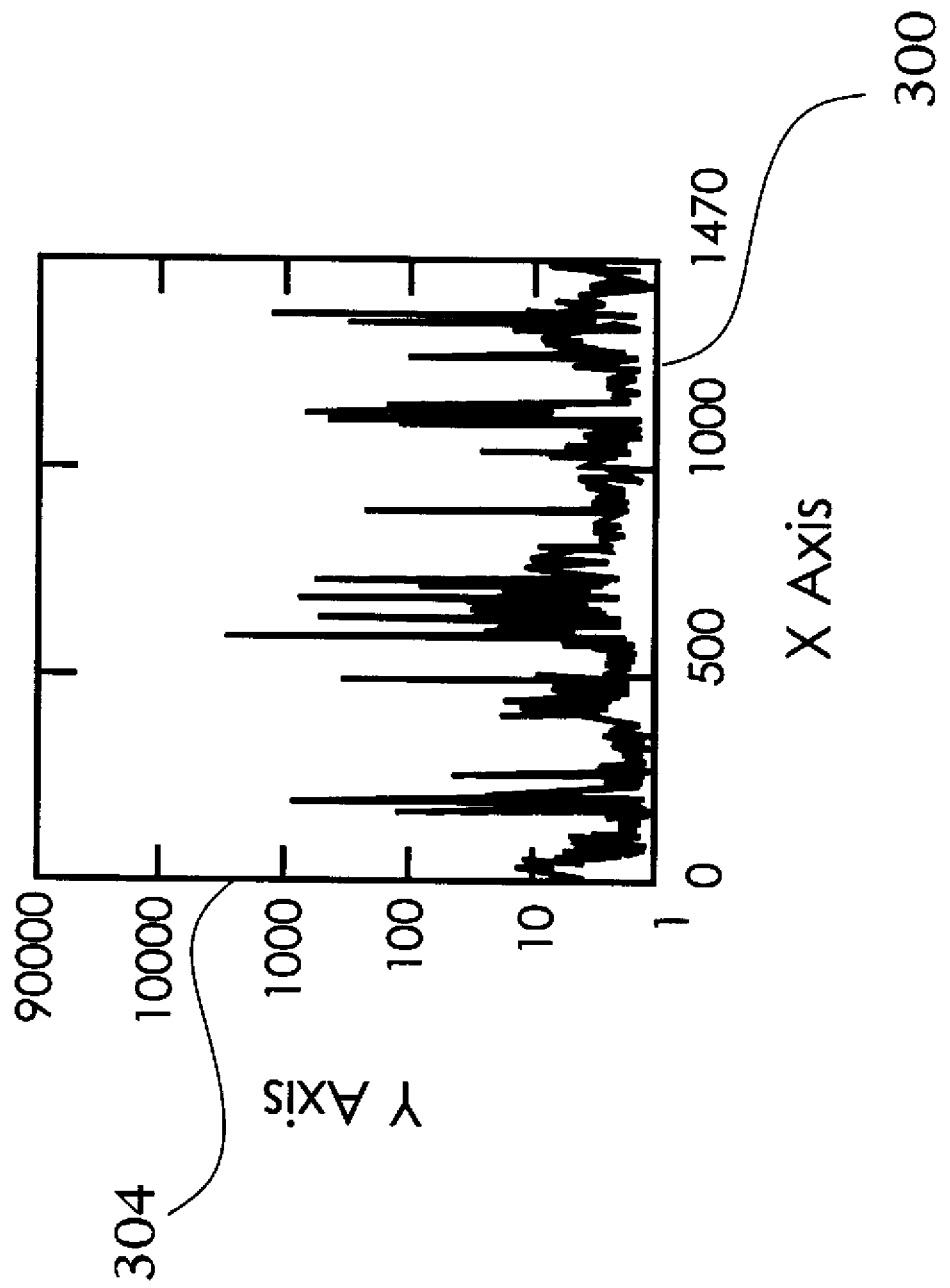
FIG. 7 is an x-y graph showing the cut detection results for the first frame of a sample test set.

The test data 2ndhalf2 is used as an example for the shot segmentation. Only 1,471 frames were processed because only the region around the candidate detected by the audio processing modules was of interest. FIG. 7 shows the segmentation results for the 1,471 frames. The X-axis 300 represents the number of frames and the Y-axis 304 represents the histogram difference based on the $X^2$ comparison equation.

If a touchdown event fits the model and if the kicking shot is correctly detected by the segmentation algorithm, then the line extraction algorithm detects the goal post. Line mark detection is more difficult, but the line extractor works reliably nonetheless. The preferred embodiment of the present invention uses color information in the edge detector to achieve better results for extracting line marks.

Table 3 presents the video analysis results:

| Algorithm | Correct Detection | Miss Detection | False Alarms |
|---|---|---|---|
| Shot Identification | 4 (out of 5) | 1 (out of 5) | 0 |

Of the five test sets with touchdowns, actually 2ndhalf6 does not fit the model because its touchdown starts with a kickoff shot (instead of a lining up shot) and ends with a 2-point conversion shot (instead of kicking an extra point shot).

Figure 8A:
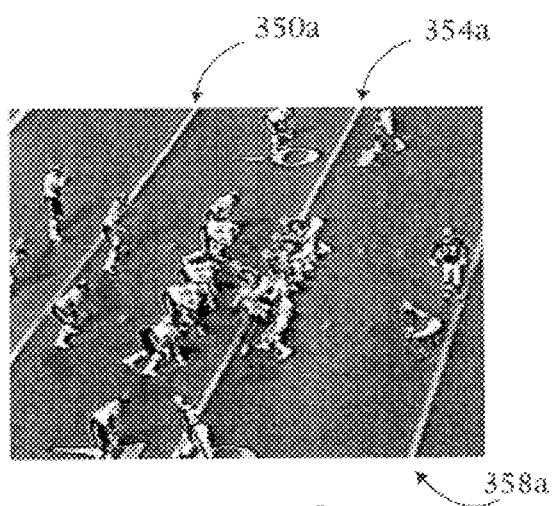
FIG. 8a is a graphic frame showing the graphical contents for identifying the lineup shot for the touchdown sequence.
Figure 8B:
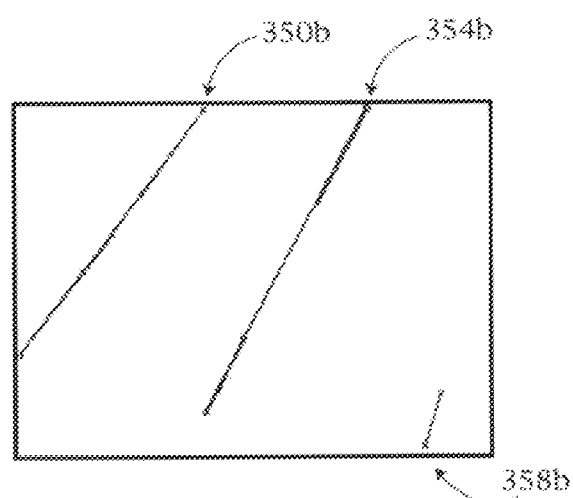

Lastly, FIG. 8a shows how the present invention processed the line extraction for this example. FIG. 8a shows the video of a lining up shot with line markers 350a, 354a, and 358a depicted. FIG. 8b shows the results of processing the lining up shot through the line extraction algorithm. The line extraction algorithm formed the line markers of FIG. 8a as lines 350b, 354b, and 358b.

Figure 9A:
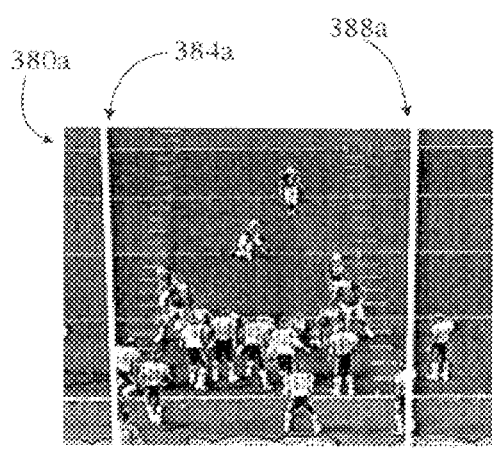
FIG. 9a is a graphic frame showing the graphical contents for identifying the kicking shot for the touchdown sequence.
Figure 9B:
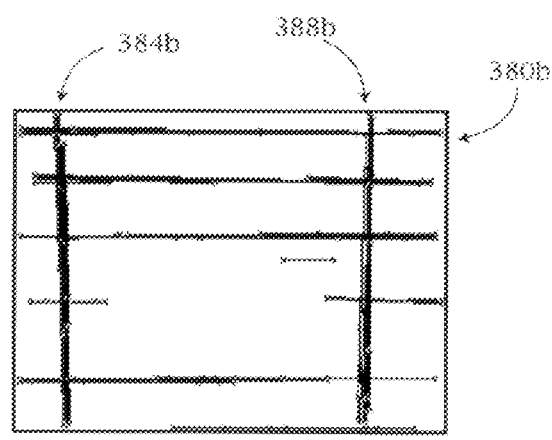

FIG. 9a shows the video of an extra point shot with line marker 380a, and goal post 384a, and 388a depicted. FIG. 9b shows the results of processing the extra point shot through the line extraction algorithm. The line extraction algorithm formed the line marker of FIG. 9a as the line 380b, and formed the goal posts as lines 384b and 388b.

The embodiments which have been set forth above were for the purpose of illustration and were not intended to limit the invention. It will be appreciated by those skilled in the art that various changes and modifications may be made to the embodiments described in this specification without departing from the spirit and scope of the invention as defined by the appended claims.

It is claimed:

1. A computer-implemented speech and video analysis system for creating an index to indicate locations of a first event occurring within audio-video data, said audio-video data containing audio data synchronized with video data to represent a plurality of events, said first event having at least one audio-feature and at least one video-feature indicative of said first event, comprising the steps of:
   (a) providing a model speech database for storing speech models representative of said audio-feature;
   (b) providing a model video database for storing video models representative of said video-feature;
   (c) performing wordspotting to determine candidates by comparing said audio data with said stored speech models, said candidates indicating positions of said audio-feature within said audio data;
   (d) establishing predetermined ranges around each of said candidates;
   (e) segmenting into shots those portions of said video data which are located within said ranges;
   (f) analyzing said segmented video data to determine video-locations based on a comparison between said segmented video data and said stored video models, said video-locations indicating positions of said video-feature within said segmented video data; and
   (g) generating an index to indicate locations of said first event based on said video-locations.

2. The method according to claim 1 wherein said predetermined ranges have a starting position of one minute before each of said candidates and an ending position of two minutes after each of said candidates.

3. The method according to claim 1 further comprising the step of deriving said audio-video data from a video tape.

4. The method according to claim 1 further comprising the step of digitizing said audio data.

5. The method according to claim 1 further comprising the step of digitizing said video data.

6. The method according to claim 1 wherein said audio-feature is a predefined utterance.

7. The method according to claim 6 further comprising the steps of:

determining energy of said predefined utterance; and storing said determined energy in said speech models.

8. The method according to claim 7 further comprising the step of determining said candidates based on Euclidean distance between said energy of said audio data and said energy speech models.

9. The method according to claim 6 further comprising the steps of:

determining Hidden Markov Models of said predefined utterance;

storing said determined Hidden Markov Models in said speech models.

10. The method according to claim 9 further comprising the step of determining said candidates based on a Hidden Markov Model comparison between said audio data and said Hidden Markov Model speech models.

11. The method according to claim 6 further comprising the steps of:

determining a phonetic model of said predefined utterance; and storing said determined phonetic model in said speech models.

12. The method according to claim 11 further comprising the step of determining said candidates based on a dynamic time warping analysis performed between said audio data and said speech models.

13. The method according to claim 1 wherein each of said shots being a contiguous set of video data depicting a discrete activity within an event.

14. The method according to claim 13 further comprising the step of segmenting said video data based upon a histogram difference $X^2$ comparison between said segmented video data and said stored video models.

15. The method according to claim 13 further comprising the step of storing line representations of said video-feature within said stored video models.

16. The method according to claim 15 further comprising the step of performing line extraction upon said segmented video data.

17. The method according to claim 14 further comprising the step of storing color characteristics of said video-feature within said stored video models.

18. The method according to claim 17 further comprising the step of determining video-locations based on comparing color data of said video data with said color characteristics of said stored video models.

19. The method according to claim 13 further comprising the step of storing texture characteristics of said video feature within said stored video models.

20. The method according to claim 19 further comprising the step of determining video-locations based on comparing texture data of said video data with said texture characteristics of said stored video models.

21. The method according to claim 1 further comprising the step of storing a predefined transition of shots within said video models, each of said shots being a contiguous set of video data depicting a discrete activity within an event.

22. The method according to claim 21 wherein said discrete activity includes two football teams lining up in a football formation.

23. The method according to claim 21 wherein said discrete activity includes a football team attempting a field goal.

24. The method according to claim 21 wherein said predefined transition of shots includes a lining up shot, an action shot, an aftermath shot, and an extra point shot.

25. The method according to claim 21 further comprising the step of comparing said shots from said video data to said stored predefined transition of shots to identify said first event.

26. An apparatus for creating an index to indicate locations of a first event occurring within audio-video data, said audio-video data containing audio data synchronized with video data to represent a plurality of events, said first event having at least one audio-feature and at least one video-feature indicative of said first event, comprising:

a model speech database for storing speech models representative of said audio-feature;

a model video database for storing video models representative of said video-feature;

a wordspotter coupled to said model speech database for determining candidates based on comparison between said audio data with said stored speech models, said candidates indicating positions of said audio-feature within said audio data;

range establishing means coupled to said wordspotter for establishing predetermined ranges around each of said candidates;

a segmenting device coupled to said range establishing means for segmenting into shots those portions of said video data which are located within said ranges;

an video analyzer coupled to said segmenting device and to said model video database for determining video-locations based on a comparison between said video data and said stored video models, said video-locations indicating positions of said video-feature within said video data; and an indexer coupled to said video analyzer for creating indicating the locations of said first event within said audio-video data based on said determined video-locations.

27. The apparatus according to claim 26 wherein said predetermined ranges have a starting position of one minute before each of said candidates and an ending position of two minutes after each of said candidates.

28. The apparatus according to claim 26 wherein said audio-video data is derived from a video tape.

29. The apparatus according to claim 26 wherein said audio data is digital audio data.

30. The apparatus according to claim 26 wherein said video data is digital video data.

31. The apparatus according to claim 26 wherein said audio-feature is a predefined utterance.

32. The apparatus according to claim 31 wherein said speech models are based upon energy of said predefined utterance.

33. The apparatus according to claim 32 wherein said wordspotter selects said audio-locations based on Euclidean distance between said energy of said audio data and said speech models.

34. The apparatus according to claim 31 wherein said speech models are based upon Hidden Markov speech models of said predefined utterance.

35. The apparatus according to claim 34 wherein said wordspotter selects said audio-locations based on a Hidden Markov Model comparison between said audio data and said Hidden Markov speech models.

36. The apparatus according to claim 31 wherein said speech models are based upon a phonetic model of said predefined utterance.

37. The apparatus according to claim 36 wherein said wordspotter selects said audio-locations based on a dynamic time warping analysis performed on said audio data and said speech models.

38. The method according to claim 26 wherein each of said shots being a contiguous set of video data depicting a discrete activity within an event.

39. The apparatus according to claim 38 wherein said segmenter device segments said portions of said video data based upon a histogram difference $X^2$ comparison.

40. The apparatus according to claim 38 wherein said video models are based upon line representations of said video-feature.

41. The apparatus according to claim 40 wherein said video analyzer includes a line extraction device for representing said video data as a set of lines.

42. The apparatus according to claim 38 wherein said video models include color characteristics of said video-feature.

43. The apparatus according to claim 42 wherein said video analyzer includes a color analysis device for comparing color data of said video data with said color characteristics of said video models.

44. The apparatus according to claim 38 wherein said video models include texture characteristics of said video-feature.

45. The apparatus according to claim 44 wherein said video analyzer includes a texture analysis device for comparing texture data of said video data with said texture characteristics of said video models.

46. The apparatus according to claim 26 wherein said video models are based upon a predefined transition of shots, each of said shots being a contiguous set of video data depicting a discrete activity within an event.

47. The apparatus according to claim 46 wherein said discrete activity includes two football teams lining up in a football formation.

48. The apparatus according to claim 46 wherein said discrete activity includes a football team attempting a field goal.

49. The apparatus according to claim 46 wherein said predefined transition of shots includes a lining up shot, an action shot, an aftermath shot, and an extra point shot.

50. The apparatus according to claim 46 wherein said video analyzer compares shots from said video data to said predefined transition of shots to identify said first event.

* * * * *